A. H. WHEELER.
DEVICE FOR KEEPING RECORDS.
APPLICATION FILED DEC. 7, 1908.
948,676.
Patented Feb. 8, 1910.
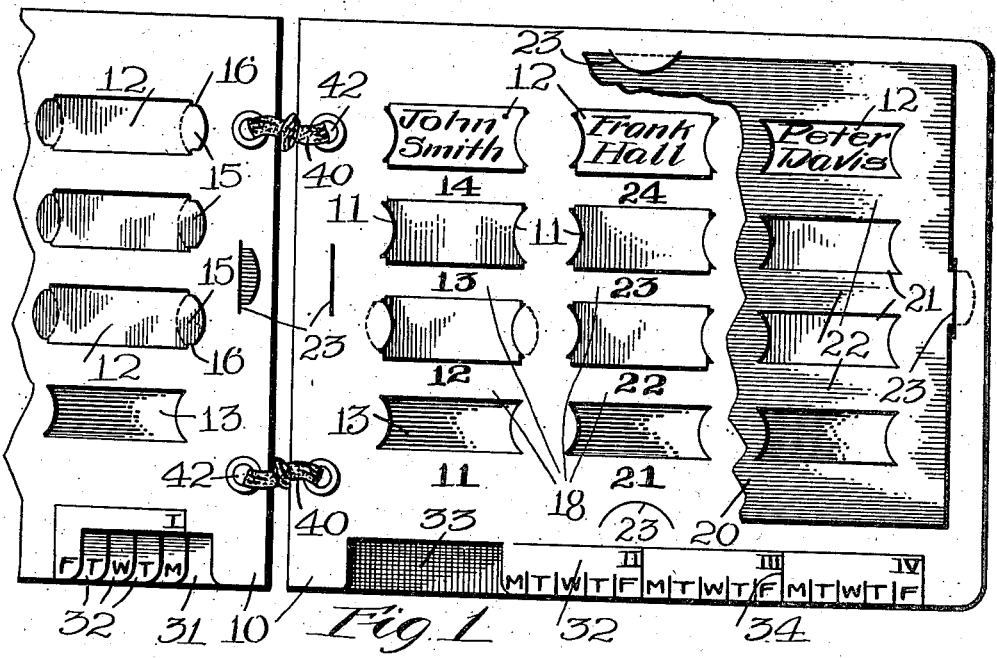
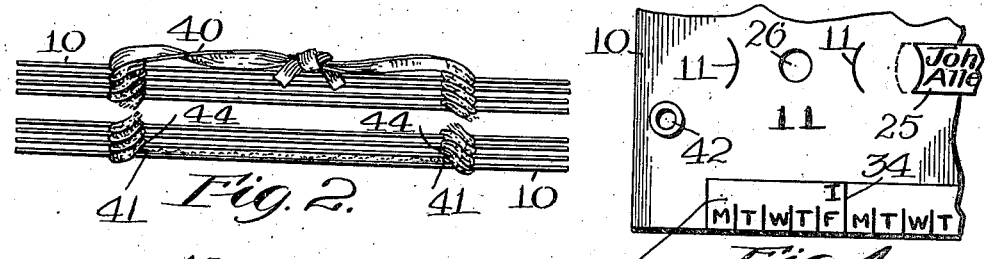
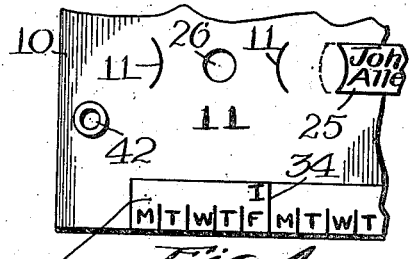
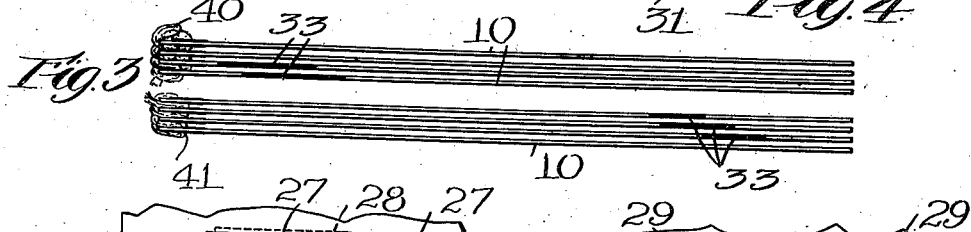
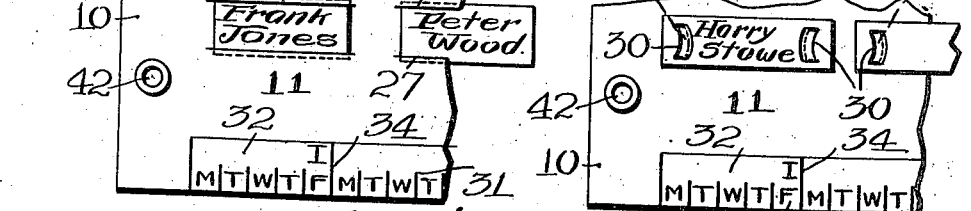
Witnesses:
C. F. Nissou
E. M. Allen
Inventor:
A. H. Wheeler
by Attorneys
Southgate & Southgate

UNITED STATES PATENT OFFICE.

ALBERT HARRY WHEELER, OF WORCESTER, MASSACHUSETTS.

DEVICE FOR KEEPING RECORDS.

948,676.  Specification of Letters Patent.  Patented Feb. 8, 1910.

Application filed December 7, 1908. Serial No. 466,260.

*To all whom it may concern:*

Be it known that I, ALBERT HARRY WHEELER, a citizen of the United States, residing at Worcester, in the county of Worcester and State of Massachusetts, have invented a new and useful Device for Keeping Records, of which the following is a specification.

This invention relates to a device for keeping records, and the principal objects thereof are to provide a simple and effective means whereby records of many kinds can be kept in which individually removable cards or labels are employed for each subject of the record; to provide means for allowing of conveniently changing the arrangement of the cards among themselves; to provide convenient means whereby additional records can be introduced or the old ones removed as may be desired; to provide means whereby the record can be quickly and easily altered or amended without interfering with or injuring or disturbing the other parts of the same record and without necessitating the erasure of marks previously made; to provide means to be used, in connection with the above mentioned record, for receiving upon its surface entries of information chiefly for temporary use and so formed that such entries can form a permanent record and can be read and utilized after being removed simply by putting it back in registration with the above mentioned record; to provide an improved form of index whereby no small index tabs will have to be employed for turning the pages; and to provide an improved means for movably securing the leaves or sheets of the record together so that they can be opened out flat at all times and so that they will come back into proper registration and will not require any special construction of book binder's hinge or the like.

Further objects and advantages of the invention will appear hereinafter.

Reference is to be had to the accompanying drawings in which—

Figure 1 is a plan of a record book or collection of carrier sheets opened out and showing several of the features of one form of this invention and showing a supplemental record sheet partly broken away. Fig. 2 is an end elevation on an enlarged scale showing the fastening means for the several pages. Fig. 3 is a side elevation illustrating the index, and Figs. 4, 5, and 6 are plans of modified forms of detachable record cards or labels showing enough of the carrier sheet to illustrate how they are applied thereto.

This invention is capable of use for many purposes, as for example to keep a record of the sittings, desks or positions assigned to different persons, as for example, in school rooms, laboratories, churches, etc.; to keep a record of persons using lockers, closets in gymnasiums, clubs, etc.; to keep a record of the position in which articles may be found in warehouses, storehouses, on shipboard, in museums, and various other places; to keep a record of the names of guests occupying assigned rooms in hotels, clubs, apartments and the like and of persons occupying locations in asylums, hospitals, jails, and the like; to keep a record of the names of owners of tenants of different sections of real estate and of their interests therein, and for various other purposes.

While the invention may be applied to a variety of uses, it will be described herein with particular reference to its use in keeping a record of the names of pupils or persons assigned to different positions, seats, tables, etc. of a class room, laboratory or other meeting place at certain specified times during a definite period of time in other words, as a seating plan. In this connection it may be said that it is common practice in class rooms to keep on a sheet of paper a record or list of the different persons belonging to some particular group, division, class or the like and the names of those in different groups or divisions are commonly entered as a whole on different sheets or pages of paper. As new persons appear or as those once enrolled leave the group, division or class, the record has to be erased or otherwise altered and the same is true when a person has to be transferred from one assigned position to another. These various erasures or cancellations increase the labor of examining the record, require constant vigilance in order to prevent mistakes, and necessitate a great deal of labor and inconvenience. A great deal of trouble and inconvenience is necessitated also to keep a record of those who are accustomed to appear only at a part of the recitations or other exercises.

In order to provide a simple and effective means for overcoming or avoiding the difficulties and disadvantages of the methods which are used in practice for such purposes and to provide certain additional features of convenience and improvements, a record is provided according to the form of this invention shown in Figs. 1, 2 and 3 which is made up of a series of carrier leaves or sheets 10. Each of these is provided with incisions 11 forming means by which a series of removable cards or labels 12 can be held in position temporarily. For this purpose these incisions preferably are arranged in pairs or in sets of other numbers so as to provide means for securing the ends or other portions of the cards or labels 12 in certain predetermined definite positions upon the carrier sheets 10. As the edges of the slits are normally substantially in contact they constitute means for gripping both sides of the cards at opposite points so as to securely hold them in position.

The incisions 11 are shown in Fig. 1 disposed or arranged in pairs, those of each pair being convex toward each other. In this particular form all the material between these two cuts is removed so as to form an open space 13. The removable cards or labels 12 designed for use with this form of carrier sheet are shown as having oppositely projecting tabs 15 and as provided with shoulders 16 extending oppositely from the inner ends of the tabs. In use these tabs go in through the incisions and the shoulders abut against the extreme ends thereof so that the removable cards are held against longitudinal motion by these shoulders in engagement with the ends of the incisions while they are held against transverse or up and down motion by the engagement of the sides of the tabs with the ends of the incisions. This permits of placing the cards in a flat position on the main carrier sheets or leaves.

In the form of the invention under discussion, it will be seen that the main part of the removable card when in position will partly or wholly cover the opening between the incisions and will be visible from the back side of the sheet on account of the opening therethrough; consequently, both sides of this card may be used for record purposes, or two record cards may be placed in position one superposed upon the other and the outside faces of the two cards may be used for making entries. It will be seen that whenever two or more of the carrier sheets 10 are superposed one upon the other as they are when they are formed into a booklet, the openings in the several sheets will register with each other. It will be understood that each of the carrier sheets is concerned with either a single day or a single short period of time, or with a number thereof arranged in any desired way. These openings act as means for determining whether or not a card 12 has been placed on any of the carrier sheets in any certain place. These sheets being made up in advance, if it is desired to know whether a certain place is vacant for a whole term or other period, it can be seen at a glance through the openings. If that seat has been assigned to any one for some future date the fact will appear from the front.

It will be understood of course that various marks can be placed upon the surface of the carrier sheets 10 in the spaces 18 between the positions in which the removable cards are located so as to designate each seat or other position with a number or provide any other data that may be desired.

If it is desired to keep further records or make entries of information to be removed from the main carrier sheets, a supplemental record sheet 20 can be employed as shown in Fig. 1. This sheet is provided with openings 21 similar in shape to the spaces 13, between the incisions 11 so that when superposed upon one of the carrier sheets the removable cards can be seen therethrough and if desired the openings may be large enough to expose the permanent numbering or other entries on the spaces 18 of the record sheets. It will readily be understood that if one of these supplemental record sheets is placed upon a carrier sheet 10 bearing upon one of its surfaces one or more of the removable cards 12, strips 22 of the supplemental record sheets will be adjacent to the removable cards which may be then upon the main carrier sheet and immediately below them. This supplemental record sheet thus affords a convenient place for entries of any such information as may be desired relative to the removable cards which may be seen through the openings in it. Thus for example, when used as a seating plan, entries relative to marks of scholarship, absence and various other things may be made directly upon the strips 22 of the supplemental record sheet in such a way as to appear in connection with such names or other data as may be entered on the removable cards. The supplemental record sheet may be used for a single day or for a longer time and at the end of the period of its use it may be reversed and the rear side used or a new sheet substituted. The information which it contains can be preserved as a permanent record and those relating to the same class can be collected and read at any future time by applying them to the proper permanent carrier sheet. This supplemental record sheet may be held upon the record card in any convenient manner as for example, by the provision of incisions 23 in the carrier sheet overlapping the edges of the supplemental record sheets. In this way it can be quickly and conveniently removed and attached without in any way interfering with the removable cards on the carrier sheet.

The record cards or labels can be held in position in many other ways, and some of these modifications are shown in Figs. 4, 5 and 6. In Fig. 4 the record card 25 is of the same height as the incisions 11, and projects under them at the ends. The carrier sheet also is continuous between the incisions except for a perforation 26, which enables the user to see what seats are assigned as explained above. In Fig. 5 straight horizontal slits 27 are used and the cards have extensions or tabs 28 indicated by dotted lines. In Fig. 6 the cards have tabs 29 projecting under the carrier sheet through slits 30 and located within the boundaries of the card.

When a plurality of carrier sheets are used together to form a record for a number of periods of time an index preferably is employed integral with the sheets. As ordinarily constructed indexes formed on the edges of sheets or leaves have small tabs by which the leaves are generally turned, and consequently, it is a very frequent occurrence to find these tabs or the means by which they are connected with the sheets torn. In order to avoid this and provide an index in which no sheets shall be lifted by its own small tab alone and in which the tabs shall be of sufficient length to avoid the liability of breakage, and in short to strengthen the device at this point, an index is employed in which the first sheet as shown in Fig. 1 has a complete index scale 31 shown most clearly in Fig. 4 of the entire period to be covered by the record, or if it is used for some other purpose, of all the sheets thereof. On the next sheet is provided a long tab 32 integral with the sheet and preferably of the same thickness throughout as the sheet or card and having preferably at the left a notch as 33 cut out corresponding with the first portion, preferably one division, on the index scale 31 on the first carrier sheet. This tab has an index scale like the index scale 31 except for the omission of a portion of the length thereof. On the next sheet the notch is of the width of a plurality of divisions, and on the next more, and so on, so that having the record open at the first sheet as shown in Fig. 1, in order to open the record at any certain sheet it is necessary only to find the point on the index scale 31 corresponding to the sheet before the one at which the record is to be opened, then grasp the edges of the sheets by the thumb and finger at that point, and it will be found that by turning all the sheets or leaves so grasped the desired one will be exposed. In this way the sheets are not lifted by one tab but by a plurality. The scale on each index tab is shown divided by lines 34 to indicate weeks, or any other sub-division.

It will be observed that the construction of the index is such that it can be numbered or lettered on the reverse side and used when the record is the other side up to select sheets in the portion of the book which has been open as well as in the portion of the book which has been left closed.

This invention also comprises means for connecting the carrier sheets in such a way that two or more of them can be combined in book form so as to allow of opening it flat at any place without straining the edges of the carrier sheet and to obviate the necessity of constructing a book binder's hinge on the carrier sheets, and also for bringing the sheet back into proper registration when the book is closed after having been opened, so as to secure a great degree of accuracy in using the marginal index. For these purposes, a lacing of the following character is employed. This lacing can be made by means of a single string, thong, or the like 40 which passes over the edge of the bottom sheet at 41, then down through holes or eyelets 42 therein, and up around the outer edge thereof. Then the lacing is brought at 44 around the outer edge of the next sheet above, down through the corresponding perforation, and out at the underside and around the back again so as to be in position to be brought over the back of the next sheet. This is continued throughout the number of carrier sheets and the ends tied or secured in any desired way. This lacing does not require the registering of the holes on the different carrier sheets, but is effective equally when the holes through which the lacing passes are offset. This construction admits of placing the holes at a considerable distance from the edge of the sheet, thus strengthening the same to such an extent that little or no reinforcement of the edges of the perforations is required. The holes for the lacings may be reinforced by metallic eyelets or any other desired means to prevent tearing the sheets.

While I have illustrated and described certain forms in which the invention can be carried out, I am aware that many modifications can be made therein by any person skilled in the art without departing from the scope of the invention as expressed in the claims, therefore I do not wish to be limited to all the details shown, but What I do claim is:—

1. In a device of the character described, the combination of a carrier sheet having a plurality of horizontal rows of vertical inwardly-curved incisions therethrough arranged in pairs, and in alinement with each other whereby the edges of the incisions are substantially in contact, with cards or labels, each having a horizontal tab at each end adapted to project through an incision, and having vertical shoulders projecting from the inner ends of the tabs in position to engage the ends of the incisions, the edges of the incisions engaging the tabs at opposite points.

2. As an article of manufacture, a carrier sheet having thereon a plurality of vertical and horizontal rows of spaces having a definite relative arrangement, said sheet having vertical slits therethrough at the edges of said spaces, said slits being inwardly bowed toward each other, and removable cards having means for passing through said slits, the edges of said slits being substantially in contact and constituting means for gripping both sides of the cards at opposite points and holding the cards in position to cover said spaces.

3. As an article of manufacture, a carrier sheet having thereon a plurality of vertical and horizontal rows of spaces having a definite relative arrangement, said sheet having slits therethrough arranged in pairs, and removable cards having means for passing through said slits so as to hold the cards in position to cover said spaces, said spaces each having an opening therethrough of smaller area than the space between each pair of slits and separate therefrom, whereby when two or more of said sheets are superposed upon each other, the presence or absence of cards on the lower sheets can be determined through said openings, and the rear of the cards can be seen from the back of the sheet.

4. As an article of manufacture, a record book or pamphlet consisting of a series of carrier sheets connected at one edge and each having thereon a plurality of spaces, and means on opposite sides of each space for removably holding labels or cards in position to cover the spaces, said sheets having openings therethrough in said spaces between the holding means arranged in rows whereby the presence or absence of cards in any certain position on the several sheets can be determined from the front sheet without independently examining each sheet.

5. As an article of manufacture, a record book or pamphlet consisting of a series of carrier sheets connected at one edge, labels or cards removably held thereon, and a supplemental record sheet held on each carrier sheet and provided with perforations therethrough, each perforation registering with one of the cards.

6. In a device of the class described, the combination of a series of carrier sheets, a plurality of cards for each carrier sheet, said carrier sheets having spaces thereon to be covered by the cards, and means at the edges of said spaces for removably holding the cards, and a supplemental record sheet having perforations therethrough corresponding with said spaces, said carrier sheet having means for holding the supplemental record sheet in such position that the perforations thereof register with said spaces.

7. In a device of the character described, the combination of a series of carrier sheets each having a plurality of sets of spaces thereon, cards for covering said spaces, said sheets having means for removably holding the cards in position over the spaces, and a supplemental record sheet having perforations adapted to register with said spaces, and surfaces between the perforations for the reception of data, said carrier sheets having means for holding the supplemental record sheets in position.

8. As an article of manufacture a record book comprising a series of carrier sheets each having a plurality of sets of spaces thereon, cards for covering said spaces, said sheets having means for removably holding the cards in position over the spaces, and a pliable, flexible means for securing said carrier sheets together and keeping the edges thereof separated when the book is opened out flat to prevent bending the inner edges of the sheets.

9. As an article of manufacture a record book comprising a series of sheets having perforations therethrough near one edge and a lacing therefor extending downwardly through each of said perforations to the bottom of the sheet, then out and up around the edge of said sheet, then around the edge of the next sheet above, and then down through the perforation therein.

10. As an article of manufacture a record book comprising a series of stiff sheets having regularly arranged spaces thereon provided with slits at their ends for holding cards or labels thereon, each of said spaces having a perforation therethrough, and means for securing the adjacent edges of said sheets together to form a book or the like and for holding the several sheets substantially in vertical registration whether the book is closed or open, whereby said perforations in the spaces will always be in alinement.

11. As an article of manufacture a record book comprising a series of stiff sheets, each having means thereon regularly spaced apart for removably holding a plurality of cards or labels, each of said spaces having a perforation therethrough, said perforations on each sheet being adapted to register with those on the others, and a lacing for holding the edges of said sheets together, said lacing extending downwardly through each sheet to the bottom of the sheet, then out and up around the edge of said sheet, then around the edge of the next sheet above and then down through the perforation in the next sheet above, whereby said sheets are held in registration with each other while in open position, so that the perforations on each side of the lacing will all be in alinement.

In testimony whereof I have hereunto set my hand, in the presence of two subscribing witnesses.

ALBERT HARRY WHEELER.

Witnesses:
    ALBERT E. FAY,
    C. FORREST WESSON.